(12) United States Patent
Sugihara et al.

(10) Patent No.: US 7,990,684 B2
(45) Date of Patent: Aug. 2, 2011

(54) DISPERSION LIQUID OF A CONDUCTIVE COMPOSITION, A CONDUCTIVE COMPOSITION, AND A SOLID ELECTROLYTIC CAPACITOR

(75) Inventors: Ryousuke Sugihara, Osaka (JP); Kei Hirota, Osaka (JP)

(73) Assignee: Tayca Corporation, Osaka-shi (JP)

( * ) Notice: Subject to any disclaimer, the term of this patent is extended or adjusted under 35 U.S.C. 154(b) by 0 days.

(21) Appl. No.: 12/811,342

(22) PCT Filed: Apr. 9, 2009

(86) PCT No.: PCT/JP2009/057242
§ 371 (c)(1),
(2), (4) Date: Jun. 30, 2010

(87) PCT Pub. No.: WO2009/131012
PCT Pub. Date: Oct. 29, 2009

(65) Prior Publication Data
US 2010/0284129 A1    Nov. 11, 2010

(30) Foreign Application Priority Data

Apr. 21, 2008 (JP) .................... 2008-109732

(51) Int. Cl.
*H01G 9/02* (2006.01)
*H01G 9/04* (2006.01)
*H01G 9/145* (2006.01)

(52) U.S. Cl. .......... 361/525; 361/528; 428/690
(58) Field of Classification Search .............. 361/523, 361/525, 526, 527–529; 428/690
See application file for complete search history.

(56) References Cited

U.S. PATENT DOCUMENTS

| | | | | |
|---|---|---|---|---|
| 6,430,032 B2 * | 8/2002 | Sakai et al. | ........ | 361/523 |
| 6,452,777 B1 * | 9/2002 | Naito | ........ | 361/303 |
| 6,462,936 B1 * | 10/2002 | Fujimoto et al. | ........ | 361/525 |
| 6,594,141 B2 * | 7/2003 | Takada | ........ | 361/523 |
| 6,625,009 B2 * | 9/2003 | Maeda | ........ | 361/528 |
| 6,663,687 B2 * | 12/2003 | Naito et al. | ........ | 75/232 |
| 6,671,167 B2 * | 12/2003 | Araki et al. | ........ | 361/523 |
| 6,671,168 B2 * | 12/2003 | Yoshida et al. | ........ | 361/523 |
| 2005/0111165 A1 | 5/2005 | Merker et al. | | |
| 2005/0208328 A1 | 9/2005 | Hsu et al. | | |
| 2005/0267264 A1 | 12/2005 | Takei et al. | | |
| 2006/0020092 A1 | 1/2006 | Chikusa et al. | | |
| 2006/0223976 A1 | 10/2006 | Tozawa et al. | | |
| 2007/0171597 A1 | 7/2007 | Merker et al. | | |
| 2009/0021894 A1 | 1/2009 | Ning et al. | | |

FOREIGN PATENT DOCUMENTS

| | | |
|---|---|---|
| EP | 1524678 A2 | 4/2005 |
| EP | 1746613 A1 | 1/2007 |
| JP | 8-41321 A | 2/1996 |
| JP | 2636968 B2 | 8/1997 |
| JP | 2003-160647 A | 6/2003 |
| JP | 2004-265927 A | 9/2004 |
| JP | 2006-028214 A | 2/2006 |
| JP | 3906071 B2 | 4/2007 |
| JP | 2007-277569 A | 10/2007 |
| JP | 2007-529608 A | 10/2007 |
| JP | 2008-171761 A | 7/2008 |
| JP | 2009-001624 A | 1/2009 |
| WO | 2004-106404 A1 | 12/2004 |
| WO | 2005-014692 A1 | 2/2005 |
| WO | 2007-091656 A1 | 8/2007 |
| WO | 2008-132955 A1 | 11/2008 |

OTHER PUBLICATIONS

Japanese Office Action mailing date of Oct. 5, 2009, issued for corresponding Japanese Patent Application No. 2009-528940.
Japanese Notice of Allowance mailing date of Feb. 1, 2010, issued for corresponding Japanese Patent Application No. 2009-528940.
International Search Report of PCT/JP2009/057242, mailing date of Jun. 16, 2009.
European Office Action dated Mar. 17, 2011, issued in corresponding European Patent Application No. 09 733 736.4.
European Search Report dated Mar. 7, 2011, issued in corresponding European Patent Application No. 09733736.4.

* cited by examiner

*Primary Examiner* — Eric Thomas
(74) *Attorney, Agent, or Firm* — Westerman, Hattori, Daniels & Adrian, LLP

(57) ABSTRACT

Disclosed is an conductive composition that has high conductivity and excellent heat resistance and is suitable for use as a solid electrolyte in a solid electrolytic capacitor. Also disclosed is a solid electrolytic capacitor that uses the conductive composition as a solid electrolyte and has low ESR and high reliability under high temperature conditions. A dispersion of the conductive composition comprises an conductive polymer produced by oxidation polymerization of thiophene or a derivative of thiophene in water or an aqueous liquid formed of a mixture composed of water and a water-miscible solvent in the presence of polystyrenesulfonic acid and at least one material selected from phenolsulfonic acid novolak resins comprising repeating units represented by general formula (I) [wherein R represents hydrogen or a methyl group] and sulfonated polyesters; and a high-boiling solvent. The solid electrolytic capacitor comprises the conductive composition as a solid electrolyte.

9 Claims, No Drawings

DISPERSION LIQUID OF A CONDUCTIVE COMPOSITION, A CONDUCTIVE COMPOSITION, AND A SOLID ELECTROLYTIC CAPACITOR

The present invention relates to a dispersion liquid of a conductive composition, and in particular, a dispersion liquid of a conductive composition useful for a solid electrolyte of a solid electrolytic capacitor, a conductive composition obtained by drying the dispersion liquid of the conductive composition, and a solid electrolytic capacitor using the conductive composition as a solid electrolyte.

Due to having a high conductivity, a conductive polymer is used as a solid electrolyte of a solid electrolytic capacitor such as tantalum solid electrolytic capacitor, niobium solid electrolytic capacitor and aluminum solid electrolytic capacitor.

As a conductive polymer for such an application, ones obtained by oxidation polymerization of polymerizable monomers such as thiophene and derivatives thereof have been used.

As a dopant in the process of performing the chemical oxidation polymerization of the polymerizable monomers such as thiophene and derivatives thereof, organic sulfonic acids are generally used. Among them, aromatic sulfonic acids are said to be appropriate. As an oxidant, transition metals are used, and among them, a ferric one is said to be appropriate. Usually, ferric aromatic sulfonates are used as serving an oxidant and dopant of chemical oxidation polymerization of polymerizable monomers such as thiophene or derivatives thereof.

It has been reported that among ferric aromatic sulfonates, it is especially said that ferric toluenesulfonates and ferric methoxybenzenesulfonates are useful; and that the polymerization of a conductive polymer by using such salts can be performed by mixing such a compound serving as an oxidant and dopant with a polymerizable monomer such as thiophene and derivatives thereof; and that they are appropriate for industrial production. See Patent Publications Reference Nos. 1 and 2 below.

However, a polymer obtained by using ferric toluenesulfonate serving as an oxidant and dopant does not provide with sufficient performance in initial resistance value and heat resistance. A conductive polymer obtained by using ferric methoxybenzenesulfonate serving as an oxidant and dopant is lower in initial resistance value than the conductive polymer obtained by using ferric toluenesulfonate. Though it has an excellent heat resistance, it yet is not well satisfied with.

The reason is because ferric toluenesulfonate or ferric methoxybenzenesulfonate is solid and generally used in a state of alcohol solution, but such a solution precipitates during storage.

Namely, when using an alcohol solution having precipitated ferric toluenesulfonate or ferric methoxybenzenesulfonate, the homogeneousness is lowered. Thereby prepared solid electrolytic capacitor using such a conductive polymer increases the ESR (equivalent series resistance) or decreases the reliability under a high temperature condition.

Also, when using the conductive polymer as a solid electrolyte of a solid electrolytic capacitor, a conductive polymer polymerized by means of chemical oxidation polymerization has generally no solubility in a solvent. Therefore, it is required to provide a conductive polymer directly on an element having a positive electrode made of a porous material of a valve metal such as tantalum, niobium and aluminum, and a dielectric layer of an oxidation layer of the valve metal.

However, it is necessary to carry out a very complicated work to provide the conductive polymer on such an element, and there has been a problem in reproduction and process control.

Under the situations, it has been considered to develop a soluble conductive polymer (Patent Publication Reference No. 3). Patent Publication Reference No. 3 reports that polystyrene sulfonic acid, ammonium persulfate, iron salt, ethylenedioxy thiophene or the like are mixed to react so as to produce a dispersion liquid of a conducting polymer. However, a conductive polymer as obtained is considered to have to increase the conductivity in order to be used as a solid electrolyte of a solid electrolytic capacitor.

Also, a conductive polymer having a polyaniline doped with a novolak resin phenolsulfonate has been reported (Patent Publication References Nos. 4 and 5). However, a conductive polymer as produced does not have a high enough in conductivity, and in order to use it as a solid electrolyte of a solid electrolytic capacitor, it is required to further improve the conductivity.

Also, a conductive polymer having a polyaniline doped with a soluble polyester sulfonate has been reported (Patent Publication Reference No. 6). However, a conductive polymer as prepared is not high enough in conductivity, and in order to use it as a solid electrolyte of a solid electrolytic capacitor, it is required to further improve the conductivity.

Patent Publication Reference No. 1: Japan Laid-open Patent Publication No. 2003-160647

Patent Publication Reference No. 2: Japan Laid-open Patent Publication No. 2004-265927

Patent Publication Reference No. 3: Japan Patent Publication No. 2636968

Patent Publication Reference No. 4: Japan Patent Publication No. 3906071

Patent Publication Reference No. 5: Japan Laid-open Patent Publication No. 2007-277569

Patent Publication Reference No. 6: Japan Laid-open Patent Publication No. 8-41321

The present invention has been invented in view of the above. The objective of the invention is to provide a conductive polymer that can be useful as a solid electrolyte of a solid electrolytic capacitor, and to utilize the excellent properties of the conductive polymer to provide a solid electrolytic capacitor having a lowered ESR and an improved reliability under a high temperature condition.

The inventors of the present invention have studied in order to resolve the objectives, they have completed the invention. There is provided a dispersion liquid of a conductive polymer characterized in comprising: (i) a conductive polymer obtained by performing an oxidation polymerization of thiophene or its derivatives in water or in an aqueous solution of a mixture of water with a water-miscible solvent in the existence of polystyrene sulfonate and at least one selected from the group consisting of a novolak resin phenolsulfonate having a repeating unit represented by the general formula (1), and a sulfonated polyester; and (ii) a high boiling point solvent.

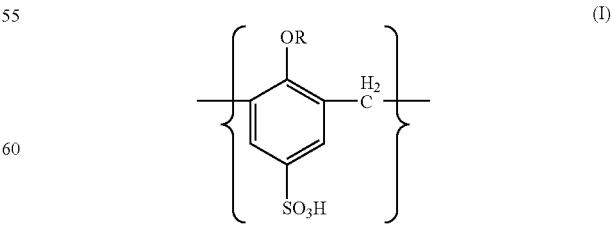

(In the Formula, R Represents Hydrogen or Methyl Group.)

Namely, the present invention relates to a dispersion liquid of a conductive polymer characterized in comprising: (i) a conductive polymer obtained by performing an oxidation polymerization of thiophene or its derivatives in water or in an aqueous solution of a mixture of water and a water-miscible solvent in the existence of polystyrene sulfonate and at least one selected from the group consisting of a novolak resin phenolsulfonate having a repeating unit represented by the general formula (1), and a sulfonated polyester; and (ii) a high boiling point solvent.

The present invention relates to a dispersion liquid of a conductive polymer characterized in comprising: (i) a first conductive polymer obtained by performing an oxidation polymerization of thiophene or its derivatives in water or in an aqueous solution of a mixture of water with a water-miscible solvent in the presence of polystyrene sulfonate; (ii) a second conductive polymer obtained by performing an oxidation polymerization of thiophene or its derivatives in water or in an aqueous solution of a mixture of water with a water-miscible solvent in the presence of at least one selected from the group consisting of a novolak resin phenolsulfonate having a repeating unit represented by the general formula (1), and a sulfonated polyester; and (iii) a high boiling point solvent:

Furthermore, the present invention relates to a conductive composition obtained by drying the dispersion liquid of the conductive composition, and a solid electrolytic capacitor using the conductive composition as a solid electrolyte.

The conductive composition of the present invention has a high conductivity, an excellent heat resistance, so that it is proper to be used as a solid electrolyte of a solid electrolytic capacitor. By using it as a solid electrolyte of a solid electrolytic capacitor, the solid electrolytic capacitor can be provided with a lowered ESR and improved reliability under a high temperature.

In the present invention, upon polymerization of the conducting polymer, a polystyrene sulfonate and at least one selected from the group consisting of a novolak resin phenolsulfonate having a repeating unit represented by the general formula (1), and a sulfonated polyester are used as dopant. They serve as an excellent dispersant during polymerization of the conductive polymer such that an oxidant or a polymerizable monomer such as thiophene and the derivative thereof can be homogenously dispersed in water or an aqueous solution, and such that they are incorporated in the produced polymer as a dopant. Therefore, the conductive polymer as prepared can become appropriate as using it as a solid electrolyte of a solid electrolytic capacitor, resulting in a high conductivity. Also, since the dopant serves as an excellent dispersant, the conductive polymer as prepared can be provided with an excellent heat resistance when using it as a solid electrolyte of a solid electrolytic capacitor. Also, it has a high transparency.

The polystyrene sulfonate can be provided with a number average molecular weight of 10,000 to 1,000,000.

Namely, where the polystyrene sulfonate has a number average molecular weight of less than 10,000, the conductive polymer as prepared can have a low conductivity and impaired transparency. Where the polystyrene sulfonate has a number average molecular weight of more than 1,000,000, the obtained conductive composition can be in a dispersion liquid with an increased viscosity, so that upon manufacturing the solid electrolytic capacitor, it can be difficult to handle. The polystyrene sulfonate can be provided with a number average molecular weight within the range. Within the range as mentioned, it can be 20,000 or more, and alternatively, it can be 40,000 or more, and also, it can be 800,000 or less, and it can be 300,000 or less.

The novolak resin phenolsulfonate having a repeating unit represented by the general formula (1), the number average molecular weight can be 5,000 to 500,000.

Namely, where the novolak resin phenolsulfonate has a number average molecular weight of less than 5,000, thereby obtained conductive polymer can be provided with a low conductivity or an impaired transparency. Where the novolak resin phenolsulfonate has a number average molecular weight of more than 500,000, the conductive composition can be in a dispersion liquid with a high viscosity such that it can be difficult to handle in manufacturing a solid electrolytic capacitor. As the novolak phenolsulfonic acid resin, the number average molecular weight can be within the range as mentioned above, and in particular, can be 10,000 or more, and 400,000 or less, or 80,000 or less.

Also, the sulfonated polyester can be one obtained by condensation polymerization of the mixture of alkylene glycol with a dicarboxybenzenesulfonic acid such as sulfoisophthalic acid and sulfoterephthalic acid or with a dicarboxybenzenesulfonic aciddiester such as sulfoisophthalic acid ester and sulfoterephthalic acid ester, in the presence of a catalyst such as antimony oxide and zinc oxide. Or, the sulfonated polyester can be one obtained by condensation polymerization of a mixture of: the dicarboxybenzenesulfonic acid or the dicarboxybenzenesulfonic acid diester; alkylene glycol; and terephthalic acid or terephthalic acid dimethyl, in the presence of a catalyst such as antimony oxide and zinc oxide. The sulfonated polyester can be provided with a number average molecular weight of 5,000 to 300,000.

Namely, where the sulfonated polyester has a number average molecular weight or less than 5,000, thereby obtained conductive polymer can be low in the conductivity and have an impaired transparency. Where the sulfonated polyester has a number average molecular weight of more than 300,000, the conductive composition can be in a dispersion liquid with a high viscosity, which can make it difficult to handle in manufacturing a solid electrolytic capacitor. The soluble polyester can be provided with a number average molecular weight with the range as mentioned above. Within the range, it can be 10,000 or more, and in particular, 20,000 or more; and it can be 100,000 or less, and in particular, 80,000 or less.

In the present invention, as a dopant, polystyrene sulfonate is used together with at least one selected from the group consisting of novolak resin phenolsulfonate and sulfonated polyester. Here, the polystyrene sulfonate can be mixed with at least one of the novolak resin phenolsulfonate and the sulfonated polyester to obtain a mixture, in the presence of which thiophene or derivative thereof can be subject to oxidation polymerization. Or, in the presence of the polystyrene sulfonate, thiophene or derivative thereof is subjected to oxidation polymerization to provide a first polymer, and separately, in the presence of at least one of the novolak resin phenolsulfonate and the sulfonated polyester, thiophene or derivative thereof is subject to oxidation polymerization to provide a second polymer, and then, the first and second polymers can be mixed to consequently provide the state of using the polystyrene sulfonate together with at least one of the novolak resin phenolsulfonate and the sulfonated polyester.

The ratio by mass can be as follows: the polystyrene sulfonate:at least one selected from the group consisting of the novolak resin phenolsulfonate and the sulfonated polyester=1:0.05-1:10.

Namely, with respect to the polystyrene sulfonate, where the ratio of said at least one selected from the group consisting of the novolak resin phenolsulfonate and the sulfonated polyester is lower than the above, the solid electrolytic capacitor can be high in the ESR and have an impaired heat resistance when it is used as a solid electrolyte of a solid electrolytic capacitor. With respect to the polystyrene sulfonate, where the ratio of said at least one selected from the group consisting of the novolak resin phenolsulfonate and the sulfonated polyester is higher than the above, the ESR can be high when it is used as a solid electrolyte of a solid electrolytic capacitor. With respect to the polystyrene sulfonate, the ratio of said at least one selected from the group consisting of the novolak resin phenolsulfonate and the sulfonated polyester can be within the range, but in particular, it can be 1:0.1 or more, and especially, 1:0.3 or more, and also, it can be 1:5 or less, and especially, 1:3 or less.

The dispersion liquid of the present invention contains a high boiling point solvent. The reason to include such a high boiling point solvent is to improve the film formability of the obtained conductive composition, and to lower the ESR when it is used as a solid electrolyte of a solid electrolytic capacitor. For example, in manufacturing a solid electrolytic capacitor, while an capacitor element for the solid electrolytic capacitor is immersed in a dispersion liquid of a conductive composition and taken out to dry, the high boiling point solvent can be getting out. Upon the high boiling point solvent gets out, it is considered that the layer density of the conductive composition can be thicken in the thickness direction, which narrows the distance between the conducting polymers, thereby increasing the conductivity of the conductive polymer as well as decreasing the ESR when it is used as a solid electrolyte of a solid electrolytic capacitor.

The boiling point of the high boiling point solvent can be 150° C. or more. The examples of such a high boiling point solvent can include dimethylsulfoxide (boiling point: 189° C.), γ-butyrolactone (boiling point: 204° C.), sulfolane (boiling point: 285° C.), N-methylpyrrolidone (boiling point: 202° C.), dimethyl sulfone (boiling point: 233° C.), ethyleneglycol (boiling point: 198° C.), and diethylene glycol (boiling point: 244° C.). In particular, it can be dimethylsulfoxide. In addition, the content of the high boiling point solvent can be 5 to 3,000% by mass in the conductive polymer of the dispersion liquid (Namely, with respect to 100 parts by mass of the conducting polymer, the high boiling point solvent can be at a content of 5 to 3,000 parts by mass), and in particular, it can be 20 to 700%. Where the content of the high boiling point solvent is lower than the above, the film formability of the conductive composition is impaired, resulting in that the effect to improve the conductivity of the conductive composition can be impaired. Where the content of the high boiling point solvent is higher than the above, the time requiring to dry the dispersion liquid can be longer, and also, it can cause the decrease of the conductivity.

The content of the conductive polymer in the dispersion liquid can be generally 1 to 10 mass in consideration of the handling in e.g., taking out the capacitor element therefrom. Namely, when the content of the conductive polymer is less than the above, it can require longer time to dry it. When the content of the conductive polymer is higher than the above, the viscosity of the dispersion liquid can become high such that the handling property in manufacturing a solid electrolytic capacitor is decreased.

In the dried product obtained by drying the dispersion liquid containing the conductive polymer and the high boiling point solvent, the conductive polymer is considered to be included as a main component, and a high boiling point solvent is considered to be included as a minor component. In this specification, the dried product obtained by drying the dispersion liquid of the conductive composition is referred to as a conductive composition. It should be noted that the high boiling point solvent is a solvent so that further heating process can evaporate most of it, but in the present invention, the dried product obtained by drying the dispersion liquid containing the conductive polymer and the high boiling point solvent is referred to as a conductive composition even if it include almost no high boiling point solvent therein.

In the present invention, the polymerizable monomer for synthesizing the conductive polymer by means of an oxidation polymerization can be thiophene or derivatives thereof. The derivative of the thiophene derivative can be 3,4-ethylenedioxy thiophene, 3-alkylthiophene, 3-alkoxythiophene, 3-alkyl-4-alkoxythiophene, 3,4-alkylthiophene, and 3,4-alkoxythiophene. The carbon number of the alkyl group and the alkoxy group can be 1 to 16, and in particular, 1 to 4. More in particular, 3,4-ethylenedioxy thiophene with a carbon number of two can be used.

The polystyrene sulfonate, the novolak resin phenolsulfonate and the sulfonated polyester, serving as a dopant have a solubility to water or a aqueous solution including the water-miscible solvent and water, so that the oxidation polymerization can be performed in water or such an aqueous solution.

The water-miscible solvent constituting the aqueous solution can be methanol, ethanol, propanol, acetone and acetonitrile. The mixture ratio of the water-miscible solvent can be 50 mass % or less in the total of the aqueous solution.

The oxidation polymerization for synthesizing the conductive polymer can be either by means of a chemical oxidation polymerization or an electrolysis oxidation polymerization.

The oxidant for performing the chemical oxidation polymerization can be a persulfate. The persulfate can be ammonium persulfate, sodium persulfate, potassium persulfate, calcium persulfate and barium persulfate.

In the chemical oxidation polymerization, the amount of the use of the dopant, polymerizable monomer and oxidant cannot be limited. For example, when the polystyrene sulfonate and the novolak resin phenolsulfonate having the repeating unit as represented by general formula (1) are used as a dopant, and when 3,4-ethylenedioxythiophene is used as a polymerizable monomer, and when ammonium persulfate is used as an oxidant, the mass ratio of the use amount of them can be as follows: dopant:3,4-ethylenedioxythiophene:oxidant=1:0.1 to 10:0.1 to 10. In particular, dopant:3,4-ethylenedioxythiophene:oxidant=1:0.2 to 4:0.2 to 4. The temperature of the chemical oxidation polymerization can be 5 to 95° C., and in particular, it can be 10 to 30° C. The time for polymerization can be 1 to 72 hours, and in particular, 8 to 24 hours.

The electrolysis oxidation polymerization can be performed either under a constant current or a constant voltage, but when the electrolysis oxidation polymerization is performed under a constant current, the current value can be 0.05 mA/cm$^2$ to 10 mA/cm$^2$, and in particular, 0.2 mA/cm$^2$ to 4 mA/cm$^2$. When the electrolysis oxidation polymerization is performed under a constant voltage, the voltage can be 0.5V to 10V, and in particular, 1.5V to 5V. The temperature during the electrolysis oxidation polymerization can be 5 to 95° C., and in particular, 10 to 30° C. Also, the polymerization time can be 1 hour to 72 hours, and in particular, 8 hours to 24 hours. In the electrolysis oxidation polymerization, ferrous sulfate or ferric sulfate can be added as a catalyst.

Thereby obtained conductive polymer can become, after the polymerization, a state of dispersion in water or an aqueous solution, which includes a persulfate as an oxidant, an iron sulfate as a catalyst, or its decomposed product. Then, the aqueous dispersion liquid of the conductive polymer including such impurities is subjected to a disperser such as an ultrasonic homogenizer or a planetary ballmill so as to disperse the impurities, the metal components of which are then removed by a cation-exchange resin. At that time, the particle size of the conductive polymer can be 100 µm, and in particular, 10 µm or less. Then, either by means of an ethanol precipitation method, an ultrafiltration method or an anionic exchange resin, the sulfate produced by decomposition of the oxidant and the catalyst can be removed, and then, a high boiling point solvent can be added.

The conductive composition of the present invention is useful as a solid electrolyte of a solid electrolytic capacitor such as aluminum solid electrolytic capacitor, tantalum solid electrolytic capacitor, and niobium solid electrolytic capacitor, providing a solid electrolytic capacitor with a low ESR and good reliability under a high temperature condition.

As described above, when the conductive composition or the present invention is used as a solid electrolyte of a solid electrolytic capacitor, it can be used as it is. However, rather than that, it is appropriate to use a dispersion liquid that disperses the conductive composition in water or an aqueous solution, which is then dried to obtain a conductive composition to be presented to be used as a solid electrolyte. At that time, in order to increase the bonding feature between the conductive composition and the capacitor element, a binder resin can be added in the dispersion liquid of the conductive composition.

Such a binder resin can be polyurethane, polyester, acrylic resin, polyamide, polyimide, epoxy resin, polyacrylonitrile resin, polymethacrylonitrile resin, polystyrene resin, novolak resin, and silane coupling agent. In particular, polyester, polyurethane, acrylic resin or the like can be used. Also, when a sulfone group is added in a compound such as sulfonatedpolyallyl, sulfonatedpolyvinyl and sulfonatedpolystyrene, the conductivity of the conductive composition can be advantageously increased.

Hereinafter, the conductive composition of the present invention is explained in an example of using a solid electrolyte to manufacture a solid electrolytic capacitor.

First, when the conductive composition of the present invention is used as a solid electrolyte of e.g., tantalum solid electrolytic capacitor, niobium solid electrolytic capacitor and aluminum integrated layer solid electrolytic capacitor, an capacitor element made of a positive electrode of a porous body of a valve metal such as tantalum, niobium and aluminum, and a dielectric layer of an oxidation layer of the valve metal is immersed in a dispersion liquid of the conductive composition of the present invention. After taking out the capacitor element therefrom, it is dried. The steps of immersing the dispersion liquid and drying are repeated so as to provide a solid electrolyte layer of the conductive composition. Then, carbon paste and silver paste are applied and dried to provide an exterior so as to provide one such as a tantalum solid electrolytic capacitor, niobium solid electrolytic capacitor and an aluminum integrated layer solid electrolytic capacitor.

Also, a non-iron salt, organic sulfonate is used as a dopant, the capacitor element is immersed in a liquid including a polymerizable monomer and an oxidant, and taken out and washed. Then it is dried to synthesize a conductive polymer. Then, the steps of immersing it in the dispersion liquid of the conductive composition of the present invention, taking out and drying it can be repeated to provide a solid electrolyte layer, or vise versa.

Then, the element covered with the conductive composition is covered with a carbon paste and silver paste to provide an exterior to manufacture ones such as a tantalum solid electrolytic capacitor, a niobium solid electrolytic capacitor, and an aluminum integrated layer solid electrolytic capacitor.

When the conductive composition of the present invention is used as a solid electrolyte of an aluminum roll solid electrolytic capacitor, the surface of an aluminum foil is subjected to an etching treatment and a chemical conversion treatment to provide a dielectric layer, and then, a lead terminal is attached thereto, so as to provide a positive electrode. Also, a negative electrode of an aluminum foil is provided with a lead terminal. Thereby prepared positive and negative electrodes with lead terminals are wound with an interposition of a separator therebetween to manufacture a capacitor element, which is then immersed in the dispersion liquid of the conductive composition of the present invention, and taken out therefrom to dry. Then, in order to remove the conductive composition not having accommodated inside the fine pores formed by the etching treatment of the aluminum foil, it is immersed in pure water and taken out and dried. After repeating the procedures, an exterior material is provided to form an exterior to manufacture an aluminum roll solid electrolytic capacitor.

As described above, the conductive composition of the present invention is suitable to be used as a solid electrolyte of a solid electrolytic capacitor since it has a high conductivity and an excellent heat resistance as well as a high transparency. Therefore, it can be used not only as a solid electrolyte of a solid electrolytic capacitor, but also as a conductive body of a antistatic material such as antistatic film, antistatic fabric and antistatic resin. In addition to the application as described above, the conductive composition of the present invention can be used as a base material resin for a cathode active material (positive electrode material) for a battery or an anticorrosion paint, by utilizing the advantageous effects of the invention.

For example, when the conductive composition of the present invention is manufactured into an antistatic film, a base sheet is subjected to the dispersion liquid of the conductive composition, or a base sheet is immersed into the dispersion liquid of the conductive composition, and taken out and drying, so as to provide the antistatic film. Such a film can be peeled off from the base material, but rather, there can be some cases where it is appropriate not to peel off the antistatic film provided on at least one surface of the base sheet. In such cases, the base sheet serves as a support material of the antistatic sheet. Also, when the conductive composition of the present invention is manufactured into an antistatic fabric, a fabric is subjected to application of the dispersion liquid of the conductive composition, or the fabric is immersed into the dispersion liquid of the conductive composition, and taken out and dried. Upon manufacturing such an antistatic sheet or antistatic fabric, addition of a binder resin in the dispersion liquid of the conductive composition can improve the bonding property between the conductive composition and the base sheet or fabric.

EXAMPLES

Hereinafter, the present invention is described more in detail with reference to Examples. The scope of the present invention is not limited to such Examples. It should be noted that the term % to explain the concentration and use amount in the Examples is referred to as percentage by mass, unless otherwise provided.

Example 1

Polystyrene sulfonate (manufactured by Tayca Corporation with a number average molecular weight of 500,000) and sulfonated polyester (PLAS COAT Z-561 (product name)

manufactured by Goo Chemical Co., Ltd. with a number average molecular weight of 27,000) were mixed at a mass ration of 1:1 to obtain a mixture. 200 g of a 3% aqueous solution of the mixture was put in a vessel with an internal volume of 1 L. As an oxidant, 2 g of ammonium persulfate was added, which was then stirred with an agitator to dissolve. Then, 0.4 g of a 40% aqueous solution of ferric sulfate was added, and then, while stirring, 3 mL of 3,4-ethylenedioxy thiophene was gradually dropped therein to polymerize 3,4-ethylenedioxy thiophene for a period of 24 hours.

Here, the dopant (i.e., a mixture of polystyrene sulfonate and sulfonated polyester at a mass ratio of 1:1), the polymerizable monomer (i.e., 3,4-ethylenedioxy thiophene) and the oxidant (i.e., ammonium persulfate) were used at a mass ratio as follows: Dopant:polymerizable monomer:oxidant=6 g:4 g:2 g=1:0.67:0.33.

After the polymerization, it was diluted with water by four times, and subjected to a dispersion treatment by using an ultrasonic homogenizer (manufactured by Nippon Seiki Co., Ltd., US-T300 (product name)) for a period of 30 minutes. Then, 100 g of a cation-exchange resin AMBERLITE 120B (product name) manufactured by Organo Corporation was added and stirred for a period of one hour, and then, a filter No. 131 manufactured by Toyo Roshi Corporation was used to filtration. The steps of the treatment by using the cation-exchange resin and filtration were repeated three times to remove the cationic components in the liquid completely.

The liquid after the treatment was passed through a filter with porous size of 1 μm, and thereby filtrated liquid was treated by an ultrafiltration device [manufactured by Sartorius AG, Vivaflow 200 (product name) with a molecular weight cut off of 50,000], so as to remove low molecular weight components liberated in the liquid. The liquid after the treatment was diluted with water to adjust it into a concentration of 3%. Into 40 g of the 3% liquid, 4 g of dimethylsulfoxide as a high boiling point solvent were added and stirred to obtain a dispersion liquid of a conductive composition. Here, the content of dimethylsulfoxide was 330% with respect to the conductive polymer.

Next, using the dispersion liquid of the conductive composition, a tantalum solid electrolytic capacitor was manufactured and evaluated. The details are as follows: The method and the results of the evaluation are described after description of the Examples and Comparative Examples.

While a tantalum sintered body was immersed in a 0.1% of phosphoric acid aqueous solution, a voltage at 20V was applied to perform a chemical conversion treatment so as to provide an oxidation layer on the surface of the tantalum sintered body, serving as a dielectric layer. Next, into a 35% ethanol solution of 3,4-ethylenedioxy thiophene solution, the tantalum sintered body was immersed and taken out after one minute, which was then kept for five minutes. Then, it was immersed in a mixture in which it was in-advance prepared by mixing a 50% aqueous solution of butylamine phenolsulfonate (pH5) with a 30% aqueous solution of ammonium persulfate at a mass ration of 1:1 to serve as an oxidant and dopand. After 30 seconds, it was taken out and dried at room temperature for a period of 30 minutes, and then it was heated at a temperature of 50° C. for a period of 10 minutes to polymerization.

After polymerization, the tantalum sintered body was immersed in water and kept it for a period of 30 minutes and taken out. It was then dried at a temperature of 70° C. for a period of 30 minutes. After this procedure was repeated six times, it was immersed in the dispersion solution of the conductive composition as Example 1, and taken out after 30 minutes and dried at a temperature of 70° C. for a period of 30 minutes. This procedure was repeated twice, and then, it was kept at a temperature of 150° C. for a period of 60 minutes to provide a solid electrolyte layer of the conductive composition. Then, the solid electrolyte layer was covered with a carbon paste and silver paste to manufacture the tantalum solid electrolytic capacitor.

Example 2

Polystyrene sulfonate [manufactured by Tayca Corporation with a number average molecular weight of 100,000) and novolak resin phenolsulfonate having a repeating unit represented by the general formula (I) (manufactured by Konishi Chemical Inc. Co., Ltd., lotEG0727 (product name) with a number average molecular weight of 60,000, where R in the formula is hydrogen] were mixed at a mass ration of 3:1 to obtain a mixture. 600 g of a 4% aqueous solution of the mixture were put into a vessel of stainless steel having an internal volume of 1 L. As a catalyst, 0.3 g of ferrous sulfate 7 hydrates were added to dissolve. Into the mixture, 4 mL of 3,4-ethylenedioxy thiophene were gradually dropped. The mixture was stirred with a stirring spring of stainless steel. A positive electrode was attached to the vessel and a negative electrode was attached to the stirring spring. A constant current of 1 mA/cm$^2$ was applied for a period of 18 hours to perform an electrolysis oxidation polymerization. After the electrolysis oxidation polymerization, the mixture was diluted with water by four times, and then, using an ultrasonic homogenizer (manufactured by Nippon Seiki Co., Ltd., US-T300 (product name)), a dispersion treatment was performed for a period of 30 minutes. Then, similar to Example 1, a treatment by a cation-exchange resin and filtration were repeated three time to remove cationic components from the liquid.

The liquid after the treatment was passed through a filter with porous size of 1 μm, and thereby filtrated liquid was treated by an ultrafiltration device (manufactured by Sartorius AG, Vivaflow 200 (product name) with a molecular weight cut off of 50,000), so as to remove low molecular weight components liberated in the liquid. The liquid after the treatment was diluted with water to adjust it into a concentration of 3%. Into 40 g of the 3% liquid, 4 g of dimethylsulfoxide as a high boiling point solvent were added and stirred to obtain a dispersion liquid of a conductive composition. Here, the content of dimethylsulfoxide was 330% with respect to the conductive polymer.

Except for using the dispersion liquid of the conductive composition as prepared above instead of using the dispersion liquid of the conductive composition of Example 1, the same procedures as Example 1 were performed to manufacture a tantalum solid electrolytic capacitor as Example 2.

Example 3

600 g of a 4% aqueous solution of Polystyrene sulfonate (manufactured by Tayca Corporation with a number average molecular weight of 100,000) were put in a vessel of stainless steel with an internal volume of 1 L. To the vessel, 0.3 g of ferrous sulfate seven hydrates were added to dissolve, and then, 4 mL of 3,4-ethylenedioxy thiophene were gradually dropped. The mixture was stirred with a stirring wing of stainless steel. A positive electrode was attached to the vessel, and a negative electrode was attached to a base portion of the stirring wing. A constant current of 1 mA/cm$^2$ was applied for a period of 18 hours to perform an electrolysis oxidation polymerization. After the electrolysis oxidation polymerization, the mixture was diluted with water by four times, and using an ultrasonic homogenizer (manufactured by Nippon Seiki Co., Ltd., US-T300 (product name)) for a period of 30 minutes to perform a dispersion treatment. Then, 100 g of a cation-exchange resin AMBERLITE 120B (product name) manufactured by Organo Corporation was added to stir the mixture for a period of one hour. Then, the mixture was filtered with a filter No. 131 manufactured by Toyo Roshi Corporation. The procedure of the treatment by the cation-exchange resin and filtration was repeated three times to completely remove the cationic components such as iron ion in the liquid.

The liquid after the treatment was passed through a filter with porous size of 1 μm, and thereby filtrated liquid was treated by an ultrafiltration device [manufactured by Sartorius AG, Vivaflow 200 (product name) with a molecular weight cut off of 50,000], so as to remove low molecular weight components liberated in the liquid. The liquid after the treatment was diluted with water to adjust it into a concentration of 3%. To 40 g of the 3% liquid, 4 g of dimethylsulfoxide as a high boiling point solvent were added and stirred to obtain a dispersion liquid of a conductive composition. Here, the content of dimethylsulfoxide was 330% with respect to the conductive polymer.

Separate from the above, 200 g of a 3% aqueous solution of a novolak resin phenolsulfonate having a repeating unit represented by the general formula (I) (manufactured by Konishi Chemical Inc. Co., Ltd., lotEG0727 (product name) with a number average molecular weight of 60,000 wherein R is hydrogen in the formula) was put in a vessel with an internal volume of 1 L. As an oxidant, 2 g of ammonium persulfate were added, and then, the mixture was stirred with a stirrer to dissolve. Next, 0.4 g of a 40% aqueous solution of ferric sulfate were added therein, and while stirring, 3 mL of 3,4-ethylenedioxythiophene were gradually dropped, and over a period of 24 hours, a chemical oxidation polymerization of 3,4-ethylenedioxythiophene was performed.

After the polymerization, it was diluted with water by four times, and subjected to a dispersion treatment by using an ultrasonic homogenizer [manufactured by Nippon Seiki Co., Ltd., US-T300 (product name)] for a period of 30 minutes. Then, 100 g of a cation-exchange resin AMBERLITE 120B (product name) manufactured by Organo Corporation were added and stirred for a period of one hour, and then, a filter No. 131 manufactured by Toyo Roshi Corporation was used to filtration. The steps of the treatment by using the cation-exchange resin and filtration were repeated three times to remove the cationic components in the liquid completely.

The liquid after the treatment was passed through a filter with porous size of 1 μm, and thereby filtrated liquid was treated by an ultrafiltration device (manufactured by Sartorius AG, Vivaflow 200 (product name) with a molecular weight cut off of 50,000), so as to remove low molecular weight components liberated in the liquid. The liquid after the treatment was diluted with water to adjust it into a concentration of 3%. To 40 g of the 3% liquid, 4 g of dimethylsulfoxide as a high boiling point solvent were added and stirred to obtain a dispersion liquid B of a conductive composition. Here, the content of dimethylsulfoxide was 330% with respect to the conductive polymer.

Then, the dispersion liquid A and the dispersion liquid B were mixed at a mass ratio of 3:1 to be used as a dispersion liquid of a conductive composition as Example 3.

Except for using the dispersion liquid of the conductive composition as prepared above instead of using the dispersion liquid of the conductive composition of Example 1, the same procedures as Example 1 were performed to manufacture a tantalum solid electrolytic capacitor.

Example 4

In the same manner as Example 3, an electrolysis oxidation polymerization of 3,4-ethylenedioxythiophene was performed in the presence of polystyrene sulfonate. By performing the same procedure as the purification process of Example 3, a dispersion liquid C of a conductive composition with a concentration of 3% was obtained. Namely, the dispersion liquid C include the same as the dispersion liquid A of Example 3.

Separate from the above, instead of using 200 g of a 3% of aqueous solution obtained by mixing polystyrene sulfonate (manufactured by Tayca Corporation with a number average molecular weight of 100,000) with sulfonated polyester (number average molecular weight of 27,000) at a mass ratio of 1:1, 200 g of a 3% aqueous solution of sulfonated polyester [manufactured by Goo Chemical Co., Ltd., PLAS COAT Z-561 (product name) with a number average molecular weight of 27,000] were used. Other processes were the same as Example 1, and in the presence of the sulfonated polyester, a chemical oxidation polymerization of 3,4-ethylenedioxythiophene was conducted in the same manner as Example 1. Then, the purification process and addition of dimethylsulfoxide in the same manner as Example 1 were performed so as to obtain a dispersion liquid D of a conductive composition with a concentration of 3%. The content of dimethylsulfoxide was 330% with respect to the conductive polymer.

Then, the dispersion liquid C and the dispersion liquid D were mixed at a mass ratio of 1:1 to be used as a dispersion liquid of a conductive composition as Example 4.

Except for using the dispersion liquid of the conductive composition as prepared above instead of using the dispersion liquid of the conductive composition of Example 1, the same procedures as Example 1 were performed to manufacture a tantalum solid electrolytic capacitor.

Example 5

The dispersion liquid C of the conductive composition as prepared in accordance with Example 3 and the dispersion liquid D of the conductive composition as prepared in accordance with Example 4 were mixed at a mass ratio of 1:2 to obtain a dispersion liquid of a conductive composition as Example 5.

Except for using the dispersion liquid of the conductive composition as prepared above instead of using the dispersion liquid of the conductive composition of Example 1, the same procedures as Example 1 were performed to manufacture a tantalum solid electrolytic capacitor.

Comparative Example 1

Instead of 200 g of a 3% of polystyrene sulfonate (number average molecular weight of 500,000) of Example 1 and sulfonated polyester (number average molecular weight of 27,000) obtained by mixing at a mass ratio of 1:1, 200 g of a 3% of polystyrene sulfonate (manufactured by Tayca Corporation with a number average molecular weight of 100,000) were used. Except for this, the same procedures as Example 1 were used to obtain a dispersion liquid of a conductive composition.

Except for using the dispersion liquid of the conductive composition as prepared above instead of using the dispersion liquid of the conductive composition of Example 1, the same procedures as Example 1 were performed to manufacture a tantalum solid electrolytic capacitor.

Comparative Example 2

Instead of 200 g of a 3% of polystyrene sulfonate (number average molecular weight of 500,000) of Example 1 and sulfonated polyester (number average molecular weight of 27,000) obtained by mixing at a mass ratio of 1:1, 200 g of a 4% of a novolak resin phenolsulfonate having a repeating unit represented by the general formula (I) [(manufactured by Konishi Chemical Inc. Co., Ltd., lotEG0727 (product name) with an average molecular weight of 60,000, in which R is hydrogen in the formula] were used. Except for the difference, the same procedure as Example 1 was performed to obtain a dispersion liquid of a conductive composition.

Except for using the dispersion liquid of the conductive composition as prepared above instead of using the dispersion liquid of the conductive composition of Example 1, the same procedures as Example 1 were performed to manufacture a tantalum solid electrolytic capacitor.

Comparative Example 3

Different from Example 2 in which 600 g of a 4% of a mixture of a polystyrene sulfonate (number average molecular weight of 100,000) with a novolak resin phenolsulfonate (number average molecular weight of 60,000) at a mass ration of 3:1 were used, 600 g of a 4% of a sulfonated polyester (manufacture by Goo Chemical Co., Ltd., PLAS COAT Z-561 (product name) with a number average molecular weight of 27,000) were used. Except for this difference, the same procedures as Example 2 were performed to obtain a dispersion liquid of a conductive composition.

Except for using the dispersion liquid of the conductive composition as prepared above instead of using the dispersion liquid of the conductive composition of Example 1, the same procedures as Example 1 were performed to manufacture a tantalum solid electrolytic capacitor.

With respect to the tantalum solid electrolytic capacitors as prepared in accordance with Examples 1 to 5 and Comparative Examples 1 to 3, the ESR and capacitance were measured. The results are shown in Table 1. The methods to measure the ESR and the capacitance are as follows. In measurement of the ESR, an LCR meter, 4284A, manufactured by HEWLETT PACKARD Corporation was used under the conditions of 25° C. and 100 kHz. In measurement of the capacitance, an LCR meter, 4284A, manufactured by HEWLETT PACKARD Corporation was used under the conditions of 25° C. and 120 Hz. In either of the measurements, ten samples were used. The results of the ten samples of the ESR value and the capacitance value were averaged with being rounded off to the closest whole number, which are listed in Table 1.

TABLE 1

|  | ESR (mΩ) | Capacitance (μF) |
| --- | --- | --- |
| Example 1 | 18 | 151 |
| Example 2 | 19 | 151 |
| Example 3 | 14 | 152 |
| Example 4 | 15 | 151 |
| Example 5 | 13 | 151 |
| Comparative Example 1 | 26 | 151 |
| Comparative Example 2 | 220 | 134 |
| Comparative Example 3 | 181 | 141 |

As shown in Table 1, the tantalum solid electrolytic capacitors of Examples 1 to 5 had a smaller ESR than those of Comparative Examples 1 to 3, and as equivalent as or larger capacitance than those of Comparative Examples 1 to 3. Namely, Examples 1 to 5 had a small ESR and large capacitance, having an excellent properties as a solid electrolytic capacitor.

Next, ten tantalum solid electrolytic capacitors in accordance with Examples 1 to 5 and Comparative Examples 1 to 3 were manufactured, which were kept at a temperature of 125° C. for a period of 200 hours. Then, in the same manner as explained above, the ESR and the capacitance were measured. The results are listed in Table 2.

TABLE 2

|  | ESR (mΩ) | Capacitance (μF) |
| --- | --- | --- |
| Example 1 | 19 | 150 |
| Example 2 | 20 | 150 |
| Example 3 | 15 | 151 |
| Example 4 | 16 | 150 |
| Example 5 | 14 | 150 |
| Comparative Example 1 | 28 | 147 |
| Comparative Example 2 | 279 | 125 |
| Comparative Example 3 | 236 | 132 |

As shown in Table 2, the tantalum solid electrolytic capacitors of Examples 1 to 5 after the storage at a high temperature had a smaller ESR than those of Comparative Examples 1 to 3, and as equivalent as or higher capacitance than those of Comparative Examples 1 to 3. Namely, the Examples show high reliability under the high temperature condition.

As described above, the tantalum solid electrolytic capacitor of Examples 1 to 5 had a small ESR, a large capacitance, and a high reliability under a high temperature condition. This indicates that the conductive composition when used it as a solid electrolyte of the tantalum solid electrolytic capacitor had a high conductivity and an excellent heat resistance.

In other words, that the ESR is small and the capacitance is large is due to a high conductivity of the conductive composition used as a solid electrolyte. Also, that the ESR is small and the capacitance is large even after the high temperature storage is due to an excellent heat resistance of the conductive composition used as a solid electrolyte.

Evaluation of Aluminum Solid Electrolytic Capacitor

Example 6

On an aluminum etched foil with a vertical length of 10 mm and a lateral length of 3.3 mm, a polyimide solution was applied and dried with a width of 1 mm in the lateral direction in order to divide a first portion extending 4 mm from one vertical end from a second portion extending 5 mm from another vertical end. Next, at a portion of 2 mm of the second portion extending 5 mm from one of vertical end, a silver wire serving as a positive electrode was attached. The first portion extending 4 mm from one vertical end (i.e., 4 mm×3.3 mm) was immersed in an 10% aqueous solution of ammonium adipate, and then, a voltage of 8V was applied to cause a chemical conversion treatment to provide a dielectric layer of an oxidation layer.

Then, the capacitor element as prepared was immersed in an 35% ethanol solution of 3,4-ethylenedioxythiophene, and after one minute, it was taken out and left for a period of 5 minutes. Then, into an oxidant and dopant solution prepared in advance by mixing a 50% aqueous solution of butylamine phenolsulfonate (pH5) with a 30% aqueous solution of ammonium persulfate at a mass ratio of 1:1, the capacitor element was immersed. After 30 seconds, it was taken out and left for 30 minutes at room temperature. Then, it was heated at a temperature of 50° C. for a period of 10 minutes to cause polymerization. Then, the capacitor element was immersed in water, and after it was left for a period of 30 minutes, it was taken out and dried at a temperature of 70° C. for a period of 30 minutes. These procedures were repeated five times, and then, the capacitor element was immersed in the dispersion liquid of the conductive composition prepared in accordance with Example 1. After 30 seconds, it was taken out and dried at a temperature of 70° C. for a period of 30 minutes. This procedure was repeated twice. Then, it was left at a temperature of 150° C. for a period of 60 minutes to provide a solid electrolyte layer of the conductive composition. Then, the solid electrolyte layer was covered with a carbon paste and a silver paste to manufacture an aluminum solid electrolytic capacitor.

Example 7

Instead of the dispersion liquid of conductive composition of Example 1, the dispersion liquid of conductive composition of Example 2 was used. Except for the difference, the same procedure as Example 6 was used to manufacture an aluminum solid electrolytic capacitor.

Example 8

Instead of the dispersion liquid of conductive composition of Example 1, the dispersion liquid of conductive composition of Example 3 was used. Except for the difference, the same procedure as Example 6 was used to manufacture an aluminum solid electrolytic capacitor.

Example 9

Instead of the dispersion liquid of conductive composition of Example 1, the dispersion liquid of conductive composition of Example 4 was used. Except for the difference, the same procedure as Example 6 was used to manufacture an aluminum solid electrolytic capacitor.

Example 10

Instead of the dispersion liquid of conductive composition of Example 1, the dispersion liquid of conductive composition of Example 5 was used. Except for the difference, the same procedure as Example 6 was used to manufacture an aluminum solid electrolytic capacitor.

Comparative Example 4

Instead of the dispersion liquid of conductive composition of Example 1, the dispersion liquid of conductive composition of Comparative Example 1 was used. Except for the difference, the same procedure as Example 6 was used to manufacture an aluminum solid electrolytic capacitor.

Comparative Example 5

Instead of the dispersion liquid of conductive composition of Example 1, the dispersion liquid of conductive composition of Comparative Example 2 was used. Except for the difference, the same procedure as Example 6 was used to manufacture an aluminum solid electrolytic capacitor.

Comparative Example 6

Instead of the dispersion liquid of conductive composition of Example 1, the dispersion liquid of conductive composition of Comparative Example 3 was used. Except for the difference, the same procedure as Example 6 was used to manufacture an aluminum solid electrolytic capacitor.

With respect to the aluminum solid electrolytic capacitors as prepared in accordance with Examples 6 to 10 and Comparative Examples 4 to 6, the ESR and the capacitance were measured. The results are shown in Table 3. In measuring the ESR and the capacitance, ten samples of each examples were tested. The values of the ESR and the capacitance listed in Table 3 were obtained by averaging the ten samples with being rounded off into the closest whole number.

TABLE 3

|  | ESR (mΩ) | Capacitance (μF) |
| --- | --- | --- |
| Example 6 | 9 | 51 |
| Example 7 | 9 | 51 |
| Example 8 | 5 | 52 |
| Example 9 | 6 | 51 |
| Example 10 | 5 | 53 |
| Comparative Example 4 | 19 | 51 |
| Comparative Example 5 | 98 | 48 |
| Comparative Example 6 | 87 | 49 |

As shown in Table 3, the aluminum solid electrolytic capacitor in accordance with Examples 6 to 10 had a smaller ESR, and as equivalent as or higher capacitance than those in accordance with Comparative Examples 4 to 6. Namely, Examples 6 to 10 had a small ESR and a large capacitance, indicating that they had excellent properties to be used as a solid electrolytic capacitor.

Next, ten samples of each of Examples 6 to 10 and Comparative Examples 4 to 6 were prepared to be subjected to a storage under the conditions of 125° C. and 200 hours, and then, subjected to the measurements of the ESR and the capacitance. The results are shown in Table 4.

TABLE 4

|  | ESR (mΩ) | Capacitance (μF) |
| --- | --- | --- |
| Example 6 | 10 | 49 |
| Example 7 | 10 | 50 |
| Example 8 | 6 | 51 |
| Example 9 | 7 | 50 |
| Example 10 | 6 | 52 |
| Comparative Example 4 | 24 | 45 |
| Comparative Example 5 | 252 | 42 |
| Comparative Example 6 | 161 | 45 |

As shown in Table 4, the aluminum solid electrolytic capacitors of Examples 6 to 10 after the high temperature storage had a smaller ESR than those of Comparative Examples 4 to 6, and an equivalent as or a larger capacitance than those of Comparative Examples 4 to 6, thereby indicating that they had a higher reliability under the high temperature condition.

According to the present invention, it is possible to provide a conductive composition to be used as a solid electrolyte of a solid electrolytic capacitor with a high conductivity and an excellent heat resistance, leading to be proper in using it as a solid electrolyte of a solid electrolytic capacitor. Using the conductive composition as a solid electrolyte, there can be provided a solid electrolytic capacitor with a low ESR and a high reliability under a high temperature condition.

What is claimed is:

1. A dispersion liquid of a conductive polymer characterized in comprising:

a conductive polymer obtained by performing an oxidation polymerization of thiophene or its derivatives in water or in an aqueous solution of a mixture of water and a water-miscible solvent in the existence of polystyrene sulfonate and at least one selected from the group consisting of a novolak resin phenolsulfonate having a repeating unit represented by the general formula (1), and a sulfonated polyester; and a high boiling point solvent having a boiling point of 150° C. or more:

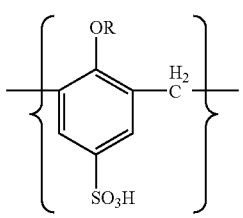

(I)

wherein R represents hydrogen or methyl group.

2. A dispersion liquid of a conductive polymer characterized in comprising:

a first conductive polymer obtained by performing an oxidation polymerization of thiophene or its derivatives in water or in an aqueous solution of a mixture of water and a water-miscible solvent in the existence of polystyrene sulfonate;

a second conductive polymer obtained by performing an oxidation polymerization of thiophene or its derivatives in water or in an aqueous solution of a mixture of water and a water-miscible solvent in the existence of at least one selected from the group consisting of a novolak resin phenolsulfonate having a repeating unit represented by the general formula (1), and a sulfonated polyester; and a high boiling point solvent having a boiling point of 150° C. or more:

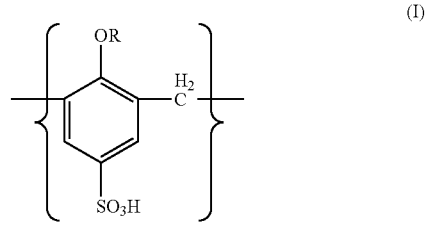

(I)

wherein R represents hydrogen or methyl group.

3. A dispersion liquid of a conductive polymer according to claim 1 or 2, wherein polystyrene sulfonate and at least one selected from the group consisting of a novolak resin phenolsulfonate having a repeating unit represented by the general formula (1) and a sulfonated polyester exist at a mass ratio of 1:0.05 to 1:10.

4. A dispersion liquid of a conductive polymer according to claim 1 or 2, wherein the thiophene derivative is 3,4-ethylenedioxy thiophene.

5. A dispersion liquid of a conductive polymer according to claim 1 or 2, wherein the high boiling point solvent having the boiling point of 150° C. or more is dimethylsulfoxide.

6. A dispersion liquid of a conductive polymer according to claim 1 or 2, further comprising a binder.

7. A conductive composition obtained by drying the dispersion liquid according to claim 1 or 2.

8. A solid electrolytic capacitor characterized in using the conductive composition according to claim 7 as a solid electrolyte.

9. A solid electrolytic capacitor comprising:
a positive electrode of a porous body of a valve metal;
a dielectric layer of an oxidation layer of the valve metal; and
a solid electrolyte layer,
wherein the solid electrolyte layer comprises: a conductive polymer provided by chemical oxidation polymerization of thiophene or derivative thereof on the dielectric layer in the existence of a non-iron salt serving as an oxidant and dopant; and a conductive composition according to claim 7 formed thereon.

* * * * *